United States Patent Office 3,045,703
Patented July 24, 1962

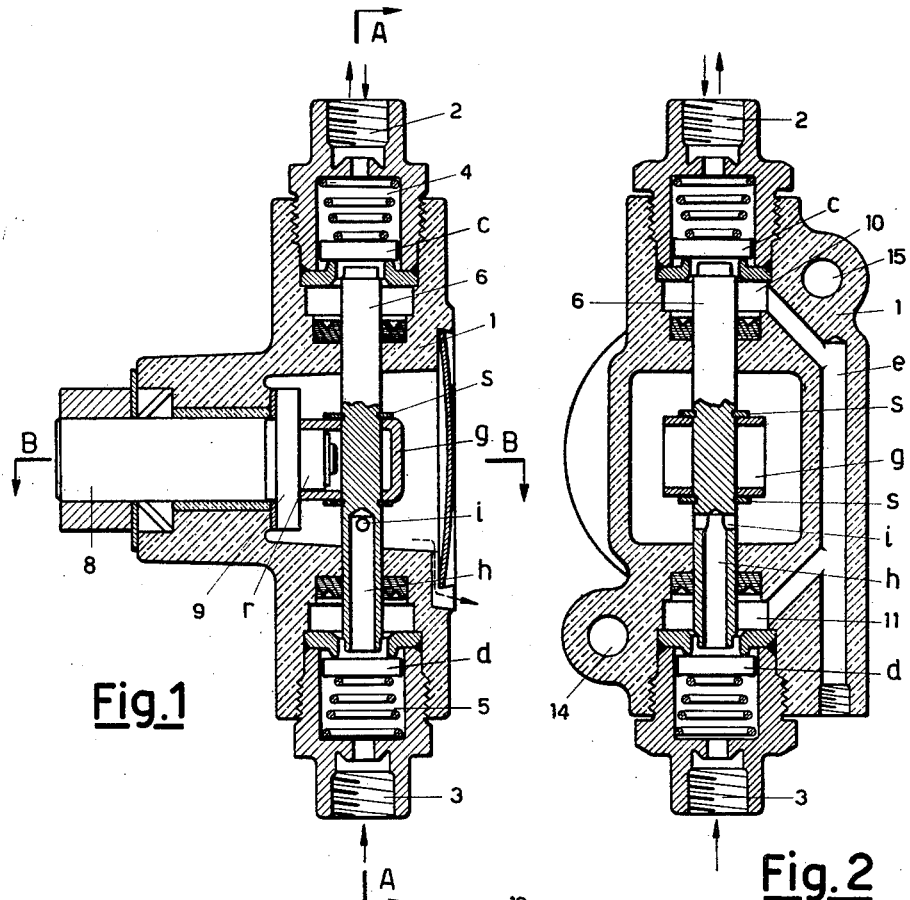
Fig.1
Fig.2
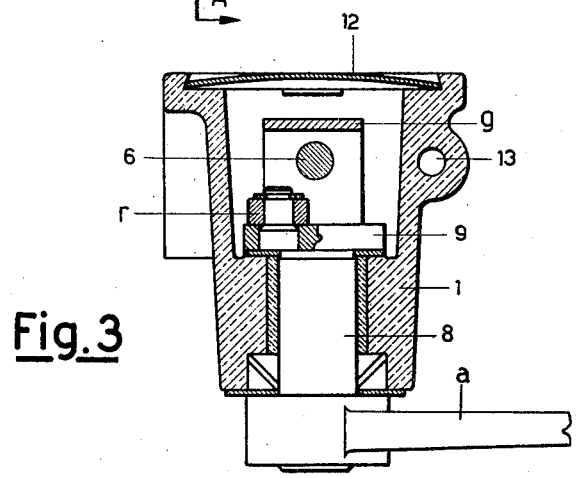
Fig.3

3,045,703
LEVELLER FOR TWO-VALVE PNEUMATIC SUSPENSION
Giuseppe Alfieri, Milan, Italy, assignor to Fabbrica Italiana Magneti Marelli S.p.a., Milan, Italy, a company of Italy
Filed Mar. 26, 1958, Ser. No. 724,038
Claims priority, application Italy Apr. 4, 1957
2 Claims. (Cl. 137—627.5)

This invention relates to a levelling device for pneumatic suspensions.

More particularly, the invention relates to a levelling device for controlling the distribution of compressed air to elastic elements of pneumatic suspensions.

Levelling devices are mounted on the frame of a vehicle and are provided with a lever having an end which is connected to the axle-and-wheel of the vehicle such that variation of load upon the vehicle causes an angular stroke of said lever with consequent actuation of the levelling device which by feeding or discharging the compressed air to and from the elastic elements restores the frame to its initial position.

It is an object of the present invention to provide a levelling device of extreme simplicity.

In accordance therewith a levelling device of the invention comprises a body defining an inlet chamber which is connected to a source of a fluid medium and an outlet chamber which is connected with the pneumatic device. A conduit is provided in the body which interconnects the chambers to define a flow path for the fluid medium therebetween. The levelling device further comprises valve means in each of the chambers for controllably isolating the associated chamber from the conduit. A control rod is provided which has opposite ends adjacent the valve means, which ends are in spaced relation from the corresponding valve means. The levelling device further comprises means operatively associated with the rod to move the same to engage one of the valve means at a time to connect the associated chamber with the conduit to enable the fluid medium to flow from the chamber to the conduit. Furthermore, the control rod is provided with an aperture in the end adjacent the inlet chamber for providing fluid communication between the atmosphere and the conduit when the aforesaid end is in spaced relation with the corresponding valve means.

The invention will now be described and illustrated with reference to the accompanying drawing wherein there is shown a preferred embodiment of the invention.

In the drawing,

FIG. 1 is a longitudinal section through the apparatus of the invention;

FIG. 2 is a section taken along A—A of the apparatus in FIG. 1; and

FIG. 3 is a cross-section taken along the axis B—B of the apparatus in FIG. 1.

In the figures numeral 1 indicates the body and numerals 2 and 3 indicate respectively the connections of the conduits directed to the elastic elements of the suspension and to the pneumatic source.

The two connections are controlled by the respective valves $c$ and $d$ which are seated by springs 4 and 5. The control of the valves is obtained by rod 6 which is movable by lever $a$ through a mechanical coupling. In particular, the lever is coupled to one end of a shaft of rotation. The shaft 8 supports at its opposite end a disc 9 which in turn supports a roll $r$ which is coupled to stirrup $g$. Stirrup $g$ preferably is of bent sheet metal which is rigidly connected to rod 6. A rotation of the shaft 8 is therefore transmitted to the roll $r$ which causes rectilinear displacement of the stirrup $g$ and, therefore, of rod 6. The rod 6 may be connected to the stirrup by elastic rings $s$.

According to a further feature of the invention, the rod 6 is provided with a conduit $h$ extending longitudinally along the rod at one end thereof, and a hole $i$ extending into the conduit $h$ and providing fluid communication therebetween and the atmosphere.

A conduit $e$ visible in FIG. 2 is provided for connecting chambers 10 and 11. The compressed air flows therein in opposite directions dependent upon which valve is actuated.

The device as shown in FIG. 3 is provided with a protection cover 12 and with fastening holes 14 and 15 visible in FIG. 2.

Operation of the device is as follows.

A variation of the load on the vehicle causes a rotation of the lever $a$ and consequently actuation of the rod 6 causing opening of the valve $d$ for increases of load on the frame and of the valve $c$ for diminution of load on the frame.

In the case of increase of load on the frame, the rod 6 is moved downwardly and acts upon the valve $d$ to open the same compressed air thereupon flows from the pneumatic source through the valve $d$ and the conduit $e$ to open valve $c$ and feed the elastic elements of the suspension until the initial predetermined position of the frame is obtained.

In the case of load diminution, rod 6 is displaced to open the valve $c$. Compressed air thereupon flows from the elastic elements valve $c$ through the conduit $e$ and is discharged to the atmosphere through conduit $h$ and hole $i$.

The frame returns to its predetermined position by which by effect of the diminution of the pressure in the elastic members of the suspension.

It should be noted that the coupling of the roll $r$ with the stirrup $g$ allows for any magnitude of stroke of the lever $a$ since the maximum displacement of the rod 6 occurs when the lever $a$ is rotated 90° from a position at which the rod 6 is centrally located between valves $c$ and $d$.

The invention has been illustrated with reference to the accompanying drawing but it is clear that modifications and adaptations are possible according to the requirements of practice without departing from the scope and principle of the present invention as defined in the following claims.

What is claimed is:

1. A pneumatic suspension for controlling the flow of a fluid medium between a source thereof and a pneumatic device, said suspension comprising: a body defining inlet and outlet chambers, the inlet chamber being adapted for connection with said source, the outlet chamber being adapted for connection with said pneumatic device, the body being provided with a conduit interconnecting said chambers to define a flow path for the fluid medium therebetween, valve means in each said chamber for controllably isolating the associated chamber from the conduit, a control rod in said body having opposite ends adjacent the valve means, each of the ends being in spaced relation from the corresponding valve means, and means operatively associated with said rod to move the same to engage one of the valve means at a time to connect the associated chamber with the conduit, to enable said fluid medium to flow from the chamber to the conduit, said control rod being provided with an aperture in the end adjacent the inlet chamber for providing fluid communication between the atmosphere and the conduit with said end in spaced relation with the corresponding valve means.

2. A pneumatic suspension as claimed in claim 1, comprising a spring acting on each of the valve means for closing the same, the spring associated with the valve means in the outlet chamber being of a strength which is overcome by the pressure of the fluid medium acting on the valve means of the outlet chamber, with the valve means in the inlet chamber displaced, to provide connection between the inlet chamber and the conduit.

References Cited in the file of this patent

UNITED STATES PATENTS

| | | |
|---|---|---|
| 1,105,947 | Woods | Aug. 4, 1914 |
| 2,171,316 | Van Sittert | Aug. 29, 1929 |
| 2,670,201 | Rossman | Feb. 23, 1954 |
| 2,722,987 | Dean | Nov. 8, 1955 |

FOREIGN PATENTS

| | | |
|---|---|---|
| 1,119,010 | France | 1956 |